United States Patent Office 3,340,228
Patented Sept. 5, 1967

3,340,228
FIBER-FORMING ORGANOPOLYSILOXANES
Tse C. Wu, Waterford, N.Y., assignor to General Electric Company, a corporation of New York
No Drawing. Filed Dec. 28, 1964, Ser. No. 421,595
5 Claims. (Cl. 260—46.5)

This invention relates to organopolysiloxanes which are fiber-forming. More particularly, it relates to diorganosiloxane polymers having recurring units of the formula:

(1) 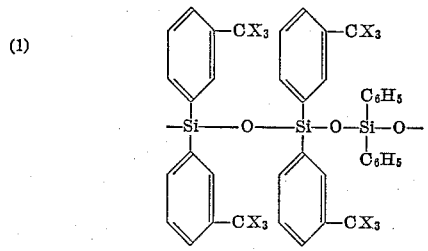

where X is selected from the group consisting of H and F.

Organopolysiloxanes containing aryl groups are known to be more thermally stable and more resistant to radiation than their alkyl counterparts. However, the completely aryl-substituted organopolysiloxanes presently known in the art are brittle, resinous, often low molecular weight solids. The brittleness of these polymers significantly limits their utility.

The brittleness of the all phenyl-substituted organopolysiloxanes is believed to be due chiefly to the high crystallinity of such systems. Theoretically, any modification which would disturb the crystallinity would render the polymer more flexible. Thus, when some of the phenyl substituents are replaced by alkyl substituents, a high molecular weight, rubbery organopolysiloxane results. However, substitution of aryl groups with alkyl groups sacrifices the thermal stability which is gained by the use of aryl substituents. Thus, a desired aryl-substituted polymer would be one wherein the crystallinity was disturbed while still utilizing a substituent providing high temperature properties and radiation resistance.

In accordance with the present invention it has unexpectedly been discovered that if two of every three phenyl substituents on an organopolysiloxane chain are substituted with meta-tolyl or substituted meta-tolyl groups, the crystallinity is upset sufficiently to provide a flexible, tough, rubbery polymer. Additionally, an organopolysiloxane where two-thirds of the phenyl groups have been replaced by meta-tolyl, or meta-trifluoromethylphenyl groups, can be spun into elastomeric fibers which are useful in a variety of situations in which it has hitherto been impossible to employ organosilicon polymers. Thus, the peculiar heat stability, inertness, and radiation resistance of organopolysiloxanes can now be utilized in such applications as fibrous insulating materials, filtering media, and non-woven fabrics for industrial uses.

The fact that the meta-tolyl and substituted meta-tolyl containing organopolysiloxane form such useful polymers, in that they combine heat stability with flexibility, is especially surprising in view of the fact that similar properties are not obtained when the organopolysiloxanes are substituted with similar amounts of paratolyl and ortho-tolyl radicals. Polymers formed from materials containing para-tolyl substituents possessed about the same degree of brittleness as similar all phenyl-substituted polymers. Attempts to polymerize materials containing ortho-tolyl substituents resulted in very low molecular weight polymers, or in no polymer at all.

Briefly, the present invention involves polydiorganosiloxanes having recurring units of the structure:

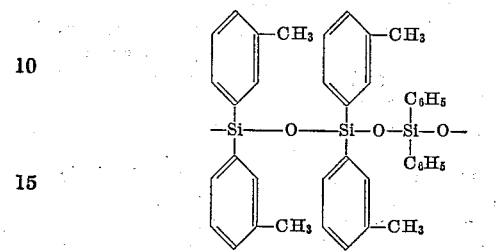

where X is as previously defined. These polymers are formed by treating organocyclotrisiloxanes substituted with meta-tolyl or meta-trifluoromethylphenyl groups with catalytic amounts of a polymerization catalyst.

The cyclotrisiloxanes which can be utilized are selected from the class consisting of:

(2)

(3) 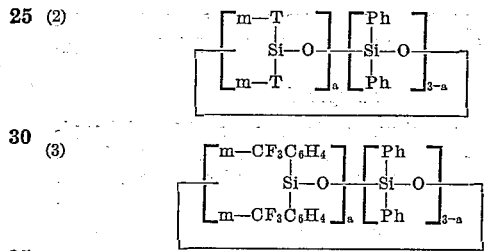

where m—T is the meta-tolyl radical, Ph is the phenyl radical, and $a$ is an integral number of from 2 to 3, inclusive. When $a$ is 2 in the compounds of either Formula 2 or 3, the cyclotrisiloxane may be homopolymerized. When $a$ is 3 in the compounds of either Formula 2 or 3, the cyclotrisiloxane is copolymerized in a molar ratio of 2:1 with hexaphenylcyclotrisiloxane to produce the polymer having recurring units of Formula 1.

The preparation of the cyclotrisiloxanes of Formulas 2 and 3 where $a$ is 2, is shown in my copending application Ser. No. 421,637, filed concurrently herewith and assigned to the same assignee as the present invention.

When hexa-m-tolylcyclotrisiloxane is to be utilized, it can be formed either by the recation of sym-tetra-m-tolyldisiloxanediol and dichlorodi-m-tolylsilane or by the reaction of sym-dichlorotetra-m-tolyldisiloxane and di-m-tolylsilanediol. For example, 23.5 g. of sym-tetra-m-tolyldisiloxanediol was placed in a dropping funnel with 220 ml. of benzene attached to a reaction vessel. Into a second dropping funnel, attached to the same reaction vessel, were placed 14.0 g. of dichlorodi-m-tolylsilane in benzene to equal the volume of the disiloxanediol solution. The solutions from each of the funnels were added at an equal rate to the vessel which contained 400 ml. of benzene and 12 ml. of pyridine, used to absorb the hydrogen chloride generated. The solids formed during the reaction were filtered off, the solvent removed by distillation, and the product successively washed and filtered with toluene, hexane, and ethanol. The product was recrystallized from hexane, then from pentane, and yielded 19.5 g. (57% based on the theoretical), of solids melting at 81–82° C. An infrared spectrum of the product was consistent with the structure:

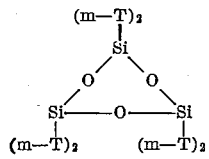

where m—T is again the meta-tolyl radical.

The polymerization, as mentioned, is carried out in the presence of catalytic amounts of a polymerization catalyst. Among the catalysts which can be used are potassium hydroxide, potassium naphthalene, sodium α-sodioacetate, and butyl lithium. Exemplary of a catalyst amount is 40 parts per million of the catalyst, as potassium hydroxide, based on the weight of cyclotrisiloxane present.

Further the polymerization can be accomplished in the presence or in the absence of a solvent. The cyclotrisiloxane to be polymerized should be present in an amount of from 30% to 100% and the solvent in an amount of from 70% to 0% of the total. Among the solvents which can be utilized are the hydrocarbons, such as pentane, hexane, heptane, benzene, toluene, and xylene.

The polymers of the present invention can have intrinsic viscosities in the range of from about 0.5 to 4.0 deciliters per gram. This corresponds to about 100 to 8000 units of Formula 1 or molecular weights of from 100,000 to 5,000,000.

The formation of the polymer of the present invention will now be described in greater detail. These examples should be considered as illustrative only and not as limiting in any way the full scope of the invention as covered in the appended claims.

PREPARATION OF POLYMER FROM 1,1-DIPHENYL - 3,3,5,5 - TETRA-m-TOLYLCYCLOTRISILOXANE

Example 1

To a reaction vessel was added 2 parts of 1,1-diphenyl-3,3,5,5 - tetra - m-tolylcyclotrisiloxane. The vessel was placed into a bath heated to 125° C. and vacuum applied. The cyclotrisiloxane was melted and stirred, using a magnetic stirring bar. The vacuum was then released and the molten compound was flushed with nitrogen. A polymerization catalyst consisting of a sufficient amount of freshly prepared potassium naphthalene in tetrahydrofuran, to provide a concentration equivalent to 40 p.p.m. as potassium hydroxide, based on the cyclotrisiloxane, was added. The vacuum was reapplied and, in a few seconds, polymerization took place. Heating was continued for 15 additional minutes and the polymer was then allowed to cool to room temperature. The polymer was dissolved in toluene and precipitated twice with methanol to remove low molecular weight fractions. It was found to have an intrinsic viscosity of 2.83 deciliters per gram, in toluene at room temperature. The polymer was pliable and soluble in chloroform. The structure of the polymer was consistent with that of Formula 1:

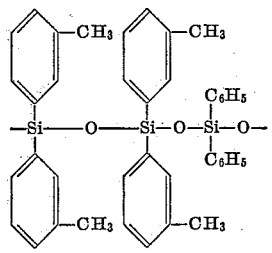

The polymer had about 4000 of such units and a molecular weight of about 2,500,000.

The polymer was dissolved in chloroform and forced into an alcoholic bath through a hypodermic syringe. The polymer solution coagulated rapidly to form a continuous filament which, shortly after spinning, could be cold drawn up to nine times its original length with a considerable amount of orientation when examined under a polarizing microscope.

The polymer would not melt when placed on a 200° C. hot plate. A quantity of one g. of the polymer and 0.0084 g. of dicumyl peroxide were placed in a container with 20 ml. of chloroform. The mixture was shaken until the polymer dissolved and the resulting solution was poured into a level metal tray. The chloroform was allowed to evaporate slowly, over a period of about 3.5 hours, resulting in the formation of a thin film. The film was placed in a 0.005 inch mold and pressed for 15 minutes at 340° F. under 10,000–12,000 p.s.i. pressure. The film was then cured at 200° C. for two hours and was tested on an Instron machine using 500 g. full load and a speed of 2 inches per minute. The film was found to have an elongation of 65 percent and a tensile strength of 1160 p.s.i.

Example 2

The same equipment was used and the same procedure followed as in Example 1. To the reaction vessel were added 3 parts of the cyclotrisiloxane of Formula 2, where $a$ was 2, and a sufficient amount of freshly prepared potassium naphthalene in tetrahydrofuran to provide the equivalent of 40 p.p.m. potassium hydroxide, based on the cyclotrisiloxane. The resulting polymer had an intrinsic viscosity of 3.24 deciliters per gram, in toluene at room temperature. The structure was the same as in Example 1.

Two solutions were made from this polymer each containing one gram of the polymer in 20 ml. of chloroform. Each of the solutions was cast into a mold and the solvent allowed to evaporate. One-half of the first film (A) was not treated further. The second half of this film (B) was placed in a 0.005 inch mold and pressed at 340° F. at 10,000–12,000 p.s.i. for 15 minutes. The second film was also treated in a 0.005 inch mold at 340° F. and 10,000–12,000 p.s.i. for 15 minutes and was post-cured at 200° C. for 2 hours (C). Each of the films was then pulled on an Instron machine at 2 inches per minute. The resulting percent elongation at break, tensile strength, and swell in toluene are shown in the following table.

| Film | Elongation at break (percent) | Tensile Strength (p.s.i.) | Swelling in Toluene (percent) |
|---|---|---|---|
| A | 120 | 770 | (¹) |
| B | 120 | 440 | (¹) |
| C | 40 | 880 | 477 |

¹ Dissolved.

These data demonstrate that the m-tolyl radical crosslinks by heat treatment. Thus, such organopolysiloxanes can be thermally set without the inclusion of vinyl groups or the addition of catalyst.

Example 3

The same equipment and procedure were used as in the previous examples. The polymerization involved 15 parts of the cyclotrisiloxane described above and a sufficient quantity of freshly prepared potassium naphthalene in tetrahydrofuran to provide about 40 p.p.m. as potassium hydroxide, based on the cyclotrisiloxane. On testing, the polymer was found to have an intrinsic viscosity of 3.04 deciliters per gram, in toluene at room temperature, and the recurring units of the structure of Example 1.

A solution was prepared containing 1 part of the polymer in 4 parts of toluene. The solution was placed in a hypodermic syringe and forced into an ethanol bath. About 10 cm. beyond the tip of the hypodermic needle, the polymer solution set up into a monofilament structure. Sections of the fiber, 5 cm. long, were stretched, at room temperature, until break. A series of four samples stretched from 6.4 to 9.6 times their original lengths before break. Fibers thus produced from organopolysiloxanes can be woven into fabrics useful in commercial applications, such as insulating fibers, which combine the thermal stability and high electrical properties of aryl-substituted organopolysiloxanes. Further, they can be used as filtering media which resist corrosion at high tempertaures. This is particularly significant as the high-temperature stable aryl-substituted organopolysiloxanes have not previously been formable into fibers.

Films were formed of this polymer by dissolving the polymer in chloroform, pouring the solution into metal trays, and evaporating the chloroform. Two strips, each 13 mm. wide, were cut and heated at 200° C. for 2 hours. The tensile strength and elongation of the strips, both before and after heat-curing, were measured with the following average results:

| Cure | Tensile Strength (p.s.i.) | Elongation (percent) |
|---|---|---|
| None | 525 | 240 |
| 2 Hours at 200° C | 1,325 | 125 |

Thus, it can be seen that some heat-curing significantly increases the strength of films formed of the polymers of the present invention, while the stretchability is decreased somewhat. This is indicative of increased cross-linking.

Three duplicate films, formed as above from chloroform solutions, were subjected to hydrolytic treatments to determine the effect of heat and water on the strength of the film. Each of the samples was contained in a sealed tube of water which was placed in an oven heated at 175° C., for one week. The comparative tensile strengths and percent elongations show that the material is essentially hydrolytically stable.

*Example 4*

The same procedure, equipment, and materials were used as in the previous examples. The polymer whose structural equivalence to that of Formula 1 was confirmed by an infrared spectrum, was found to have an intrinsic viscosity of 2.85 deciliters per gram, in toluene at room temperature. This polymer was also formed into fibers from toluene solution.

*Example 5*

The same procedure, equipment and materials were used as in the previous examples. A quantity of 15 parts of the cyclotrisiloxane was polymerized with a sufficient amount of potassium hydroxide to provide about 40 p.p.m., based on the cyclotrisiloxane, and was found to have an intrinsic viscosity of 2.72 deciliters per gram, in toluene at room temperature. This polymer is also formable into fibers from toluene solution.

PREPARATION OF POLYMER FROM 1,1-DIPHENYL-3,3,5,5-TETRAKIS - (m - TRIFLUOROMETHYLPHENYL) CYCLOTRISILOXANE

*Example 6*

A mixture of 2 parts of 1,1-diphenyl-3,3,5,5-tetrakis-(m-trifluoromethylphenyl)cyclotrisiloxane and a sufficient amount of freshly prepared potassium naphthalene in tetrahydrofuran, to provide about 80 p.p.m. as potassium hydroxide, based on the cyclotrisiloxane, were placed in a reaction vessel and heated at 125° C., which is above the melting point of the cyclotrisiloxane. After about 5 minutes, a paste-like mixture was formed and the stirring bar stopped. The reaction mixture was then heated for 15 minutes and the vessel removed from the heated bath. The product was reprecipitated twice from the toluene solution and then with methanol, followed by 20 minutes of drying at 120° C. under vacuum. This produced a polymer with recurring units corresponding to the formula:

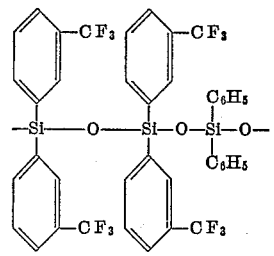

having an intrinsic viscosity of 1.68 deciliters per gram, in toluene at room temperature. This corresponds to approximately 1200 units of Formula 1 and a molecular weight of about 1,000,000.

*Example 7*

The same equipment and procedure were used as in Example 6, except that 45 p.p.m. of equivalent potassium hydroxide was used and the reaction temperature was 150° C. A polymer with recurring units corresponding to that in the previous example was formed having an intrinsic viscosity of 2.02 deciliters per gram, in toluene at room temperature.

*Example 8*

The same procedure was followed and the same material used as in Example 7, with the exception that about 25 p.p.m. of equivalent potassium hydroxide was utilized. The intrinsic viscosity of the polymer thus produced was about 3.00 deciliters per gram, in toluene at room temperature.

*Example 9*

The same procedure and material were utilized as in the previous two examples. A quantity of one part of the cyclotrisiloxane and sufficient freshly prepared potassium naphthalene in tetrahydrofuran to provide about 40 p.p.m. as potassium hydroxide, based on the cyclotrisiloxane, were heated together. The resulting polymer was found to have an intrinsic viscosity, in toluene at room temperature, of 1.80 deciliters per gram.

Each of the polymers formed in Examples 6 through 9 formed fibers when a toluene solution of the polymer was forced through a hypodermic syringe into a methanol solution. Films formed from the polymers by evaporation of the chloroform solution of the polymer showed no cross-linking when heated in an air-circulating oven at 200° C. for 20 hours. Thus, in contrast to the previously mentioned polymers of Examples 1 through 5, if cross-linking in the phenyl-m-trifluoromethylphenyl polymer is desired, a means of cross-linking, such as the inclusion of a vinyl group, must be provided.

Thus, a rough, stretchable, fiber-forming aryl-substituted organopolysiloxane has been described. These polymers show great improvement over the previously known aryl-substituted organopolysiloxanes in that they retain the heat stability and radiation resistance normally associated with such aryl-substituted polymers, while additionally having the property of being fiber-forming and flexible and tough, even at higher temperatures.

When such a fibrous organopolysiloxane is desired, a choice can be made between cross-linkable materials and non-cross-linkable materials by choosing between the diphenyltetra-m-tolyl repeating units and the diphenyltetra-kis-(m-trifluoromethylphenyl) units. Each is fiber-forming and has high temperature stability and high radiation resistance and, in film form, is tough and flexible. When a more rigid system is desired, the m-tolyl units may be utilized and when the proper degree of heating is used, additional strength is introduced into the material by the cross-linking of the integral units.

These organopolysiloxane fibers and the films formed of the phenyl-m-tolyl and phenyl-m-trifluoromethylphenyl polymers find a wide variety of uses, such as in insulating windings were flexibility, high temperature resistance, and good electrical properties are desired in a single material.

What I claim as new and desire to secure by Letters Patent of the United States is:

1. A fiber-forming polydiorganosiloxane consisting essentially of from about 100 to 8,000 recurring structural units of the formula:

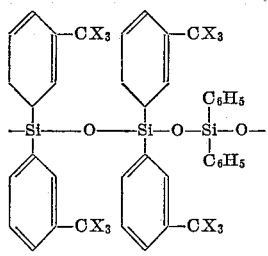

where X is selected from the group consisting of H and F.

2. The polydiorganosiloxane of claim 1, where X is H.
3. A fiber formed of the polydiorganosiloxane of claim 2.
4. The polydiorganosiloxane of claim 1, where X is F.
5. A fiber formed of the polydiorganosiloxane of claim 4.

References Cited
UNITED STATES PATENTS

| | | | |
|---|---|---|---|
| 2,640,063 | 5/1953 | Kohl | 260—448.2 |
| 2,640,066 | 5/1953 | Kohl | 260—448.2 |
| 2,821,507 | 1/1958 | Gainer et al. | 260—448.2 |
| 3,050,485 | 8/1962 | Nitzsche et al. | 260—46.5 |
| 3,146,251 | 8/1964 | Brown et al. | 260—448.2 |

DONALD E. CZAJA, *Primary Examiner.*

LEON J. BERCOVITZ, *Examiner.*

M. I. MARQUIS, *Assistant Examiner.*